United States Patent
Liu et al.

(10) Patent No.: US 11,323,346 B1
(45) Date of Patent: *May 3, 2022

(54) MONITOR DEVICE FOR USE WITH ENDPOINT DEVICES

(71) Applicant: 8×8, Inc., Campbell, CA (US)

(72) Inventors: Zhishen Liu, Campbell, CA (US); Bryan R. Martin, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/922,774

(22) Filed: Jul. 7, 2020

Related U.S. Application Data

(63) Continuation of application No. 16/571,818, filed on Sep. 16, 2019, now Pat. No. 10,708,159, which is a
(Continued)

(51) Int. Cl.
*H04L 12/26* (2006.01)
*H04L 29/06* (2006.01)
(Continued)

(52) U.S. Cl.
CPC ........ *H04L 43/0811* (2013.01); *H04L 41/065* (2013.01); *H04L 43/16* (2013.01); *H04L 43/50* (2013.01); *H04L 65/1006* (2013.01); *H04L 65/1013* (2013.01); *H04L 65/80* (2013.01); *H04L 67/10* (2013.01); *H04L 67/26* (2013.01);
(Continued)

(58) Field of Classification Search
CPC ... H04L 43/0811; H04L 41/065; H04L 43/16; H04L 43/50; H04L 65/1006; H04L 65/1013; H04L 65/80; H04L 67/10
See application file for complete search history.

(56) References Cited

U.S. PATENT DOCUMENTS 6,788,649 B1 9/2004 Dugan et al.
6,961,315 B1 11/2005 Amster et al.
(Continued)

OTHER PUBLICATIONS

A. Khalifeh and A. El-Mousa, "Performance Evaluation of VoIP Using Shortest-Widest and Modified Widest-Shortest QoS Routing Algorithms," Proc. Of the World Congress on Engineering, vol. 1, WCE 2007, Jul. 2-4, 2007, London, U.K.
(Continued)

*Primary Examiner* — Christopher B Robinson
(74) *Attorney, Agent, or Firm* — Crawford Maunu PLLC

(57) ABSTRACT

A system includes a plurality of SIP servers that are configured and arranged to provide services for a respective set of endpoints. A monitor server having at least one processor circuit receives connectivity status of the respective set of endpoint devices based on registration status provided by the endpoints to the SIP servers. Based upon the received connectivity status, endpoints having connectivity problems are parsed into subgroups. Based upon the parsed endpoints, potential problem sources for the connectivity problems of the parsed endpoints are identified. A monitor device having at LAN interface circuit connected to the LAN and at least one processor circuit receives the command from the monitor server and performs a diagnostic test on the LAN. Results from the at least one diagnostic test are provided to the monitor server.

20 Claims, 5 Drawing Sheets

Related U.S. Application Data continuation of application No. 15/148,620, filed on May 6, 2016, now Pat. No. 10,419,310.

(60) Provisional application No. 62/268,843, filed on Dec. 17, 2015.

(51) Int. Cl.

| | | |
|---|---|---|
| *H04L 29/08* | (2006.01) | |
| *H04L 43/0811* | (2022.01) | |
| *H04L 65/10* | (2022.01) | |
| *H04L 43/16* | (2022.01) | |
| *H04L 43/50* | (2022.01) | |
| *H04L 67/30* | (2022.01) | |
| *H04L 67/55* | (2022.01) | |
| *H04L 69/40* | (2022.01) | |
| *H04L 65/80* | (2022.01) | |
| *H04L 67/303* | (2022.01) | |
| *H04L 67/10* | (2022.01) | |
| *H04L 41/0631* | (2022.01) | |

(52) U.S. Cl.
CPC ............ *H04L 67/30* (2013.01); *H04L 67/303* (2013.01); *H04L 69/40* (2013.01)

(56) References Cited

U.S. PATENT DOCUMENTS

| | | | |
|---|---|---|---|
| 7,222,190 B2 | 5/2007 | Klinker et al. | |
| 7,339,934 B2 | 3/2008 | Mussman et al. | |
| 7,352,852 B1 | 4/2008 | Cocherl et al. | |
| 7,388,946 B1 | 6/2008 | Mussman et al. | |
| 7,773,587 B2 | 8/2010 | Corcoran | |
| 7,940,659 B2 | 5/2011 | Avila Gonzalez et al. | |
| 7,965,699 B1 | 6/2011 | Accardi et al. | |
| 7,983,148 B1 * | 7/2011 | Abramson | H04L 43/0811 370/217 |
| 8,046,474 B2 | 10/2011 | Kato et al. | |
| 8,063,928 B2 | 11/2011 | Krisbergh et al. | |
| 8,125,897 B2 * | 2/2012 | Ray | H04L 47/10 370/229 |
| 8,238,253 B2 * | 8/2012 | Morrill | H04L 43/04 370/241 |
| 9,203,652 B2 | 12/2015 | Petit-Huguenin et al. | |
| 9,479,341 B2 | 10/2016 | Bugenhagen et al. | |
| 9,769,321 B1 | 9/2017 | Petit-Huguenin et al. | |
| 10,419,310 B1 | 9/2019 | Liu et al. | |
| 2002/0105909 A1 | 8/2002 | Flanagan et al. | |
| 2002/0122429 A1 | 9/2002 | Griggs | |
| 2003/0079160 A1 | 4/2003 | McGee et al. | |
| 2003/0161460 A1 | 8/2003 | Dammrose | |
| 2004/0125803 A1 | 7/2004 | Sangroniz et al. | |
| 2004/0208133 A1 | 10/2004 | Jay et al. | |
| 2004/0264386 A1 | 12/2004 | Ha | |
| 2005/0025123 A1 | 2/2005 | Mitsumori et al. | |
| 2005/0201364 A1 | 9/2005 | Dalton et al. | |
| 2005/0244015 A1 | 11/2005 | Sung | |
| 2005/0271029 A1 | 12/2005 | Iffland | |
| 2006/0031576 A1 | 2/2006 | Canright | |
| 2006/0268828 A1 | 11/2006 | Yarlagadda | |
| 2007/0047571 A1 | 3/2007 | Kandikonda et al. | |
| 2007/0183440 A1 | 8/2007 | Bennet et al. | |
| 2007/0248012 A1 | 10/2007 | Glinsman et al. | |
| 2007/0286351 A1 | 12/2007 | Ethier et al. | |
| 2008/0049738 A1 | 2/2008 | Joung et al. | |
| 2008/0146216 A1 * | 6/2008 | Newman | H04L 43/50 455/424 |
| 2009/0147770 A1 | 6/2009 | Ku | |
| 2009/0245098 A1 | 10/2009 | Baker et al. | |
| 2009/0245492 A1 | 10/2009 | Baker et al. | |
| 2009/0268713 A1 * | 10/2009 | Ottur | H04M 7/0069 370/352 |
| 2010/0142377 A1 | 6/2010 | Caciula et al. | |
| 2010/0172251 A1 | 7/2010 | Adam et al. | |
| 2010/0318665 A1 | 12/2010 | Demmer et al. | |
| 2011/0087765 A1 | 4/2011 | Musgrave et al. | |
| 2011/0096762 A1 | 4/2011 | Basart | |
| 2011/0188494 A1 | 8/2011 | Johnson et al. | |
| 2014/0229614 A1 | 8/2014 | Aggarwal et al. | |
| 2016/0026520 A1 | 1/2016 | Bouta et al. | |
| 2016/0226740 A1 | 8/2016 | Van Oost et al. | |

OTHER PUBLICATIONS

"Monitoring VoIP with Cisco Network Analysis Module White Paper Mar. 2009," pp. 1-13.
Ditech Networks, "Feature Overview," "Experience Intelligence™ for VoIP Networks," www.ditechnetworks.com.
TelArix, "iXRoute®—Optimized Routing," www.telarix.com.
Squire Technologies, Signalling Specialists to the Telecoms Industry, "Offering Least Cost Routing (LCR)," (2009).

\* cited by examiner

MONITOR DEVICE FOR USE WITH ENDPOINT DEVICES

OVERVIEW

The instant disclosure relates generally to communication systems and, more particularly, to session-initiation-protocol services as used in the communications industry, including Voice-over-Internet Protocol (VoIP) services. The communications industry continues to rely upon advances in technology to realize higher-functioning systems at cost-effective prices. Telephony signals can now be transmitted by methods and systems including traditional public standard telephone networks (PSTNs), Internet telephony service providers (ITSP), packet-based systems, digital wireless systems, analog wireless systems, private branch exchanges (PBX), cable systems, T1 systems, integrated service digital networks (ISDN), and digital subscriber line (DSL) systems, to name a few.

Session-Initiation-Protocol (SIP) is a communications protocol for controlling multimedia communication sessions, which can include VoIP services (whether just voice or also with video) and also various types of instant messaging services. In SIP and similar protocols, multimedia is transmitted between endpoint devices (i.e., communication-enabled or Internet-capable computer hardware-circuit devices such as desktop computers, laptops, smart phones, tablets, thin clients, printers, POS terminals and smart cards/meters). The endpoint devices can be implemented using a variety of different hardware processing circuits with appropriate configuration (through hardwired circuitry, software, firmware, and combinations thereof) to control the setup, tear down and other essential elements of a call. As an application layer protocol, SIP can be implemented relatively independent from the underlying transport layer. While various embodiments are discussed herein in the context of SIP, it is noted that other communications protocols can also be used in many instances.

SUMMARY

Various embodiments are directed toward an apparatus for use with a system that includes a plurality of SIP servers that are configured and arranged to provide services for a respective set of endpoints. The apparatus, comprises a monitor server, the monitor server having at least one processor circuit configured to: receive connectivity status of the respective set of endpoints based on registration status provided by the endpoints to the SIP servers; parse, based upon the received connectivity status, endpoints having connectivity problems into one or more subgroups, wherein in at least one of the subgroups corresponds to endpoints on a local area network (LAN); identify, based upon the parsed endpoints, potential problem sources for the connectivity problems of the parsed endpoints; and transmit, based upon the potential problem sources, a command. The apparatus includes a monitor device having at LAN interface circuit connected to the LAN and at least one processor circuit configured to: receive the command from the monitor server; perform, in response to the command, at least one diagnostic test on the LAN; and transmit, to the monitor server, results from the at least one diagnostic test.

Certain embodiments are directed toward a method for use with a system that includes a plurality of SIP servers that are configured and arranged to provide services for a respective set of endpoints. The method includes, by a monitor server having at least one processor circuit: receiving connectivity status of the respective set of endpoints based on registration status provided by the endpoints to the SIP servers; parsing, based upon the received connectivity status, endpoints having connectivity problems into one or more subgroups, wherein in at least one of the subgroups corresponds to endpoints on a local area network (LAN); identifying, based upon the parsed endpoints, potential problem sources for the connectivity problems of the parsed endpoints; and transmitting, based upon the potential problem sources, a command. The method further includes, by a monitor device having at LAN interface circuit connected to the LAN and at least one processor circuit: receiving the command from the monitor server; performing, in response to the command, at least one diagnostic test on the LAN; and transmitting, to the monitor server, results from the at least one diagnostic test.

The above discussion/summary is not intended to describe each embodiment or every implementation of the present disclosure. The figures and detailed description that follow also exemplify various embodiments.

BRIEF DESCRIPTION OF THE FIGURES

The disclosure may be more completely understood in consideration of the following detailed description of various embodiments of the disclosure, in connection with the accompanying drawings in which.

Figure 1:
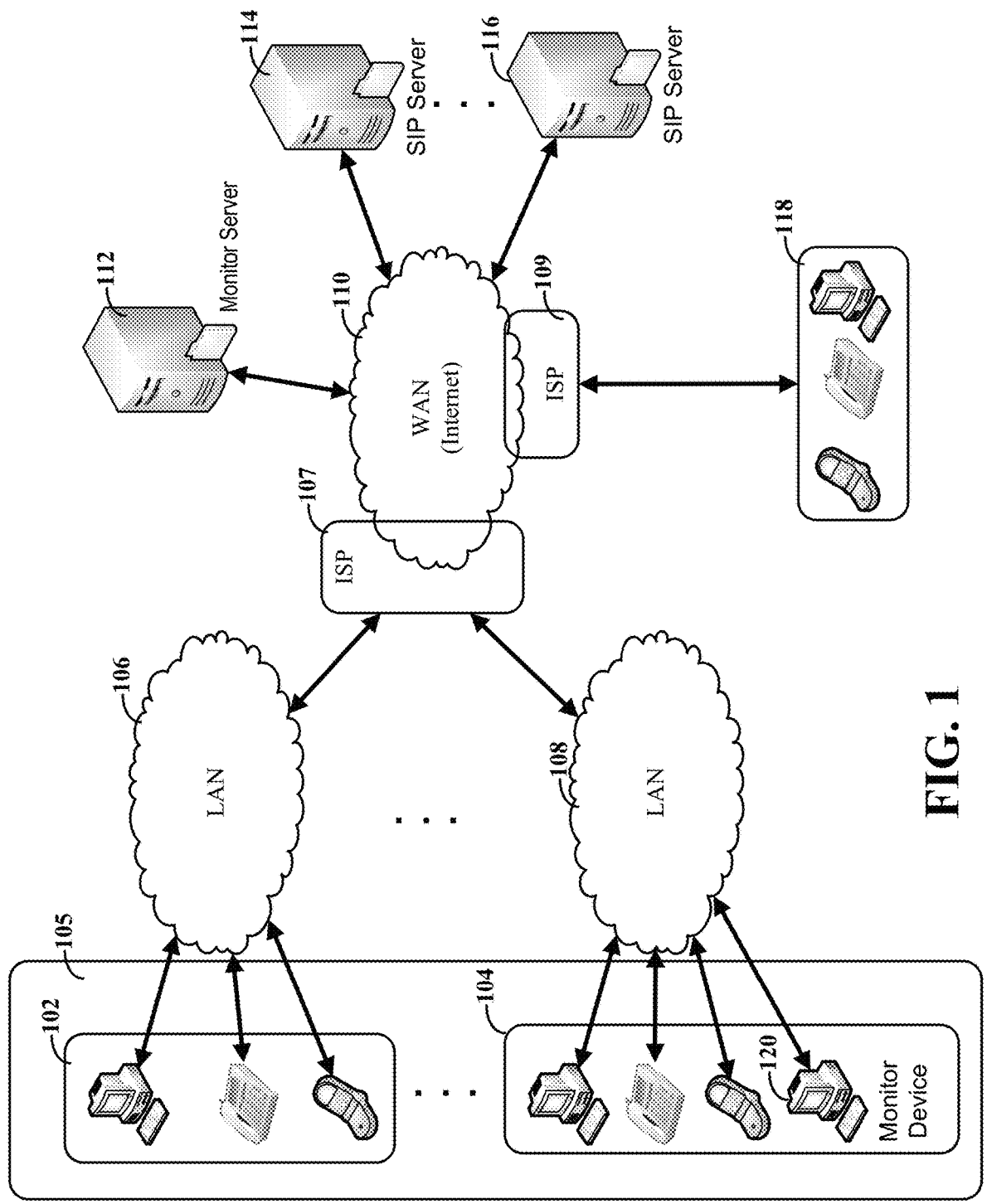
FIG. 1 shows a block diagram of a system with multiple endpoint devices and a computer monitor server, consistent with embodiments of the present disclosure.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems and methods utilizing a monitoring server to analyze status information received from VoIP endpoint devices and to identify potential network issues therefrom. While the disclosed embodiments are not necessarily limited to such applications, various aspects of the present disclosure may be appreciated through a discussion of various examples using this context.

Various embodiments of the present disclosure are directed toward a computer monitor server (or set of computer servers) that is designed to detect and report various issues with remote computer systems and computer networks. In particular embodiments, the components in the remote computer systems and networks, and their configurations, can be relatively opaque to the computer monitor server. That is, the computer monitor server can detect issues with little, if any, prior knowledge of how the remote computer system and network are configured. This can be particularly useful for allowing a third party, which provides some other service, to provide the valuable reporting in connection with their customers. For example, the third party can provide a SIP-based service that includes a plurality of SIP endpoint devices that send periodic registration or presence status information to a SIP server. A computer monitor server can be configured to detect when expected registration/presence status events are missing and then correlate the presence status against alert criteria. The customer associated with the corresponding SIP endpoints can then be contacted.

Embodiments of the present disclosure are directed toward determining which individual to contact based upon matching various alert criteria with particular endpoint devices exhibiting anomalous characteristics. One parameter of the alert criteria might be the loss of connectivity with certain subsets of endpoint devices. For example, the alert criteria can be defined by the loss of connectivity with respect to a group of endpoint devices located at a particular customer's premises. An appropriate action, such as an email to a system administrator, can be linked with the alert criteria for implementation by the computer monitor server.

In some embodiments, there can be multiple different sets of alert criteria that can be linked with different groups of endpoint devices. For instance, there can be a number of different subgroups that are each associated with a different customer system. If endpoints from multiple different subgroups lose connectivity with their SIP servers at roughly the same time, the computer monitor server can assess whether there are upstream failure points shared between the endpoints in the subgroups. For example, the subgroups might share a common Internet Service Provider (ISP). The computer monitor server can identify such common failure points and respond accordingly.

According to various embodiments, the computer monitor server can be configured to set alert criteria based upon endpoint status information other than, or in addition to, presence status. For instance, the computer monitor server can be configured to receive and analyze call quality metrics that are published to SIP servers by the endpoints. The computer monitor server can be configured to identify likely sources of poor call quality by identifying potential sources of call quality that are common between endpoints exhibiting the poor call quality. In some instances, the poor call quality can be further correlated with presence status information, such as where the presence status information indicates sporadic losses of connectivity.

In some embodiments, the computer monitor server can be configured to provide alert information to an administrator of the SIP servers. For example, the computer monitor server can generate an alert that identifies a potential issue, such as equipment at a customer location or a problem with an ISP. This information can be used by support staff that handles calls from individuals that may be having problems with their VoIP service. The support staff can communicate the likely source of the problem to assure the individuals that the problem is being addressed. This can have particular value to a VoIP provider as the call quality is often dependent upon third parties.

Certain embodiments are directed toward correlation of configuration of different components with detected problems with endpoints. For example, the computer monitor server can be configured to create subgroups for different configuration settings of endpoints or other components. As discussed in more detail herein, the computer monitor server can be configured to collect and use different parameters associated with the endpoints to identify subgroups that may signify sources of detected problems.

Various embodiments are directed toward a computer monitor server that is configured to transmit notifications to individuals associated with endpoint devices exhibiting connectivity problems. This can be useful for proactively notifying an individual that their phone service may not be working before the individual is even aware of a problem. The computer monitor server can also be configured to initiate corrective actions, such as setting up an automatic forward for the affected number or rerouting the VoIP calls to an alternative VoIP capable endpoint device of the individual.

Turning now to the figures, FIG. 1 shows a block diagram of a system with multiple endpoint devices and a computer monitor server, consistent with embodiments of the present disclosure. The system can include a number of different endpoint devices (as indicated by the components in blocks 102, 104, 118) that are configured to send status or registration information to a corresponding SIP server 114, 116. A particular type of endpoint device is a VoIP endpoint device. VoIP endpoint devices contain one or more hardware circuits (e.g., computer processing circuits) and that are configured to provide VoIP services to individuals by controlling the setup, tear down, and other elements of a VoIP call (e.g., as specified by the SIP protocol). A few non-limiting examples of endpoint devices include desktop computers, laptop computers, smart phones, VoIP telephones, and tablets.

As depicted, the endpoint devices can communicate with a corresponding SIP server over a wide area network (WAN) 110, such as the global Internet. One or more monitor servers 112 can be configured to receive information about the endpoints from the SIP servers, directly from the endpoints, or from both the SIP servers and the endpoints. For example, interface circuitry, such as a network interface card (NIC), can allow the monitor servers 112 to receive and transmit data from the endpoint devices over the Internet or other WAN 110. This information can be used by the monitor server to identify potential issues with either the endpoints or other components in the system. For example, the information can include presence status of the endpoints relative to a SIP server that the endpoint is registered with. The presence status can be provided by way of various different mechanisms. For instance, the endpoints can be configured to periodically send a presence/registration communication to the SIP servers. This information can then be reported to the monitor servers 112. In some embodiments, the presence/registration communication can be sent directly to the monitor servers 112 in addition to being sent to the SIP servers. The potential issues with either the endpoints or other components in the system can be identify when the presence/registration communications are not received at an expected time. The monitor server can identify the endpoints for which the presence/registration communications were not received. From this information, the components in the system that are used by these endpoints can be identified as possible sources of the problem.

The monitor server can also be configured to identify potential issues using information representing call quality. The call quality information can include directly measurable call metrics and parameters, such as transmission latency, jitter, packet loss, and dropped calls. Other information can include feedback from individuals, which might report problems by way of a graphical or web interface or through calls to a technical support call center that is linked back to the monitor server 112. In certain embodiments, call quality information can be provided by the endpoints using SIP publish messages with a corresponding event header. The monitor server 112 can subscribe to the call quality event for all endpoints being monitored in this manner. In some embodiments, the SIP servers can be configured to automatically add newly registered endpoints to the subscription list of the monitor server.

According to certain embodiments, the monitor server can be configured to determine when the information corresponds to a triggering event defined by alert criteria and to determine and carry out one or more actions associated with the alert criteria. For instance, one triggering event could be the failure of an endpoint to register within a predefined time window. The corresponding action might be transmitting a notification message to one or more individuals responsible for the endpoint device, an associated client network, or other related system components.

Various embodiments of the present disclosure are directed toward the use of specially-configured filtering techniques and decision algorithms of varying complexity to carry out the assessment and identification of triggering events. For example, the monitor server can be configured to group endpoints into various subgroups 102, 104, 118 and then analyze the combined the status information from the different subgroups to identify trigger events corresponding to the subgroups. In some instances, the subgroups are associated with one or more potential problem sources. Subgroups can be identified for endpoints having at least some overlap in their respective paths to the SIP server(s), whether the overlap is a shared over a communication network (e.g., local area network or LAN), firewall, router, ISP, or other component.

According to embodiments, each endpoint can be part of multiple subgroups. For example, a first endpoint might be part of a first subgroup 102 that corresponds to endpoints that communicate using LAN 106, while a second endpoint might be part of a second subgroup 104, which corresponds to endpoints that communicate using LAN 108. Each of the same endpoints can also be part of a third subgroup 105, which corresponds to endpoints that communicate with the SIP servers using ISP 107. Other endpoints might be part of a fourth subgroup 118, which corresponds to endpoints that communicate with the SIP servers using ISP 109. Using such groupings, the monitor server 112 can be configured to correlate and aggregate status information about the endpoints in order to identify likely sources of problems in the system. For example, alert criteria might correspond to a condition where all endpoints in a subgroup exhibit a similar problem. The monitor server 112 can be configured to identify all subgroups that meet this criteria. The monitor server 112 can then determine the appropriate action to take, such as whom to notify of a potential problem. For example, if a situation where the monitor server identifies that all endpoints in subgroups 102, 104, and 105 are experiencing network connectivity problems (e.g., no registration message was received during an expected time window), the monitor server can be configured to determine that the ISP 107 is to be contacted. The rationale for this decision is that the ISP 107 is more likely to be the cause than each of the LANs 106 and 108 independently experiencing problems at the same time.

According to various embodiments of the present disclosure, the monitor server 112 can be configured to determine a probability that various elements in the system are the cause of problems with connectivity and function of the endpoints. This can be particularly useful for when the available data is not very conclusive. For instance, intermittent connection problems with LAN 106 might result in the registration messages being received for only some of the endpoints in group 102. At the same time, one or more of the endpoints in group 104 might not provide a registration message for one reason or another. This might happen if the endpoint is temporarily disconnected because the endpoint is being serviced or moved to a new physical location, for example. To account for corresponding situations where the source of the problem is not immediately apparent, the monitor server 112 can be configured to determine the probability that there is an issue with one or more of LAN 106, ISP 107, and LAN 108 using this (and potentially additional) information. In a relatively simple model, the probability for each component is calculated from the percentage of endpoints experiencing the problem in the respective subgroup. For instance, if all of the endpoints in subgroup 105 lose connectivity with their SIP server at the same time, then each of elements 106, 107 and 108 will have 100% failure rates for their supported endpoints; however, they will not each be 100% likely to have failed.

The monitor server can be configured to use information on the likelihood that both LANs 106 and 108 experience failures at the same time to determine respective percentages. If, for example, the likelihood of both LANS 106 and 108 failing at the same time is 10%, then each of LANs 106 and 108 can have a 10% determined likelihood, while ISP 107 can have a 90% determined likelihood. More complex considerations might also include a chance that all three components fail at the same time (e.g., due to a utility power failure large enough to effect all three components), which would increase the likelihood for each item (e.g., 12% for each LAN and 92% for the ISP). In some instances, there might be multiple different sources with a high probability of exhibiting a problem. This might occur, for example, if there is a large scale power outage or similar event that could affect many different system components at the same time.

Once the probabilities are determined, the monitor server can then compare the determined probabilities against an action/notification threshold to determine whether or not to take corresponding actions, such as contacting an administrator of one or more of the elements.

Consistent with certain embodiments, the monitor server can be configured to determine probabilistic values based upon a number of different interrelated parameters and associated algorithms. For example, an algorithm can be designed to determine the probability that ISP 107 is experiencing bandwidth problems that are the cause of poor call quality and/or lack of connectivity to SIP servers for some of the endpoints. One term or component of the algorithm can be the probability distribution of endpoints having problems across all LANs. This term can represent the probabilities for the possible distributions of problematic endpoints from all endpoints with the assumption that ISP 107 is the source of the problem. For example, the most likely distribution might be equal percentage of problematic endpoints distributed across each of the LANs 106, 108. The algorithm might be designed such that the likelihood that any particular combination of problematic endpoints would occur due to a problem with ISP 107 will decrease as the distribution deviates further from the most likely (even) distribution. The probability distribution algorithm can also take into account whether or not certain endpoints were actively being used. For instance, if the reported problems relate to call quality, then endpoints that were not involved in a call during the relevant time period would have no expectation of having reported such problems, which would affect the expected distribution relative to if all of the endpoints were concurrently involved in calls.

According to various embodiments, the monitor server can be configured to identify various actions to take based upon action profiles for different system components that are identified as possible problem sources. There can be different profiles for different entities and their respective components, and the profiles can specify one or more trigger thresholds for when one or more corresponding actions are to be taken. For example, an administrator of LAN 106 may have a profile that specifies that a first administrator is to be notified when a certain percentage of the endpoints in subgroup 102 lose connectivity with their respective SIP server 114,116. A different profile can exist for ISP 107, and this profile may specify a second, different administrator that is to be notified if a different percentage of endpoints in group 105 loses connectivity to their respective SIP server. In some embodiments, the trigger event can be based upon a determined likelihood that one or more components are the source of the problem.

Consistent with certain embodiments, the action profiles can specify multiple trigger thresholds for the same components and for the same entity. The trigger thresholds can be for the same criteria at different levels or for different criteria (with the same or different levels). For example, an action profile for an ISP might include a first trigger threshold relating to a percentage of endpoints having poor call quality (first criteria) and a second trigger threshold relating to a probability that an ISP is a cause of a loss of connectivity for endpoints (second criteria). Moreover, the action profiles can also specify different actions for each of the trigger thresholds. For instance the example first trigger threshold might be deemed to have a relatively low priority. It can therefore be associated with an action involving the transmission of an email to a general administrator email support address. The second trigger threshold might be deemed to have a higher priority, and therefore, be associated with an action involving the transmission of a text (SMS) message to a specific administrator.

According to some embodiments, one or more monitor devices 120 can be co-located with the subgroups of endpoint devices, such as shown with subgroup 104. The monitor device 120 can be configured to run varying levels of diagnostic tests. For example, the monitor device 120 can be configured to run diagnostic tests that involve the co-located endpoint devices (e.g., with those endpoint devices located on the same LAN). The results of the diagnostics can provide additional information on, among other things, packet loss, jitter, and different signaling and media routing paths. The monitor device 120 transmits the results of the diagnostic tests to the monitor server 112.

According to various embodiments, the monitor device 120 runs the diagnostic tests in response to a communication that is received from the monitor server 112. For example, the monitor server 112 first detects a connectivity problem with one or more endpoint devices. The monitor server 112 then accesses a lookup table to identify a monitor device 120 that is located on the same LAN as the endpoint devices exhibiting a problem. The monitor server 112 transmits a command to the monitor device 120, and the monitor device 120 responds by starting one or more diagnostic tests. In certain embodiments, the command (or series of commands) can expressly specify a specific set of tests for the monitor device 120 to carry out. The monitor device 120 identifies the proper tests by deciding the received command(s). The monitor device 120 then responds to the command(s) by carrying out the specified tests and transmitting the results back to the monitor server 112. The monitor server 112 can also send a more generic communication or command, which does not specify any specific diagnostic test. The monitor device 120 can respond by starting a default set of diagnostic tests.

In some embodiments of the present disclosure, the monitor device 120 automatically runs diagnostic tests without prompting from the monitor server 112. For example, a particular monitor device 120 can periodically run a set of diagnostic tests (e.g., once every X minutes). In some instances, a monitor device 120 runs diagnostic tests in response to detect a potential problem. As a particular example, the monitor device 120 detects a loss of connectivity to the Internet and/or to a remote monitor/SIP server. In response to this detection, the monitor device runs diagnostic tests designed to help identify why connectivity was lost, such as detecting whether the LAN is operating, whether a DNS server is reachable, whether communications using other protocols and ports are possible, etc. In some instances, the monitor device can passively monitor and record network traffic characteristics. For example, the monitor device uses a packet analyzer (or packet sniffer) to capture and log network packets transmitted on the LAN. The passive monitoring can be ongoing, periodic, or in response to a trigger event.

In certain embodiments, the monitor device 120 is configured to operate in a first test mode in which one or more data streams are established between the endpoint devices and the monitor device 120. For example, the monitor device 120 can establish a real-time transport protocol (RTP) session to simulate upstream and downstream audio data being over the LAN during a VoIP call. The monitor device 120 can measure various quality metrics, such as those discussed herein. The monitor device can therefore supplement the capacities of the monitor server 112 by helping to gather more specific information regarding a customer's network, LAN, firewall, ISP routing path, call quality, etc. In doing so, the monitor device can help improve the monitor server's ability to accurately calculate the probability that any particular component is the source of a detected problem. The resulting information can be provided to the monitor server 112 over the Internet or through an alternative communication path, such as using a cellular modem or telephone line connection to the public switched telephone network (PSTN).

Consistent with various embodiments, the monitor device 120 is configured to operate in a second test mode where the monitor device 120 directs the endpoint devices to make test calls using the SIP servers. This can be particularly useful for charactering and testing properties of end-to-end signaling and media flow. For instance, once a problem is detected the monitor device 120 can be configured to periodically request that test calls be attempted. The monitor server 112 can monitor the periodic test calls in order to determine the severity of a problem and whether the problem is still present. Corresponding notifications can then be sent as discussed herein.

Consistent with certain embodiments, the endpoint devices can be configured to send a notification to the monitor device 120 in response to detected difficulties connecting with an SIP server 114. The monitor device 120 that receives such a notification will be able to determine that the LAN connection is still working, at least with respect to the endpoint devices sending the notifications. The monitor device 120 can send a separate communication to determine whether or not the SIP server 114 can be reached. Moreover, the monitor device 120 can be configured to attempt to contact other SIP servers. Alternatively or in addition, the monitor server can attempt to contact on or more alternative servers. These alternative servers do not need to be part of the VoIP provider's network, and can function as external reference points. For example, the monitor server might check whether or not a high-availability third party websites (e.g., such as a website for a major search engine) is reachable. This information can be useful for determining the likely source of the problem, whether it be the LAN, the ISP, the SIP servers, or another source.

In certain embodiments, the monitor device 120 can be configured with an alternative data connection to allow the monitor device 120 to contact the monitor server, or transmit a notification to an administrator or other individual. For example, the monitor device 120 can include a cellular modem that allows the monitor device to transmit data when the connection through the LAN is not available.

In some implementations, the monitor device 120 can be a dedicated hardware device that operates as a server with limited capacities and that is accessible by endpoint devices and the monitor server 112. The dedicated hardware device can include at least one processor circuit with a memory circuit that stores software instructions (e.g., in the form of a firmware in a non-volatile memory). In various implementations, the monitor device 120 can be a desktop computer, laptop, tablet, smart phone, or similar device that is configured with one or more software applications to perform monitor device functions that are consistent with the discussion and technical details discussed herein.

Figure 2:
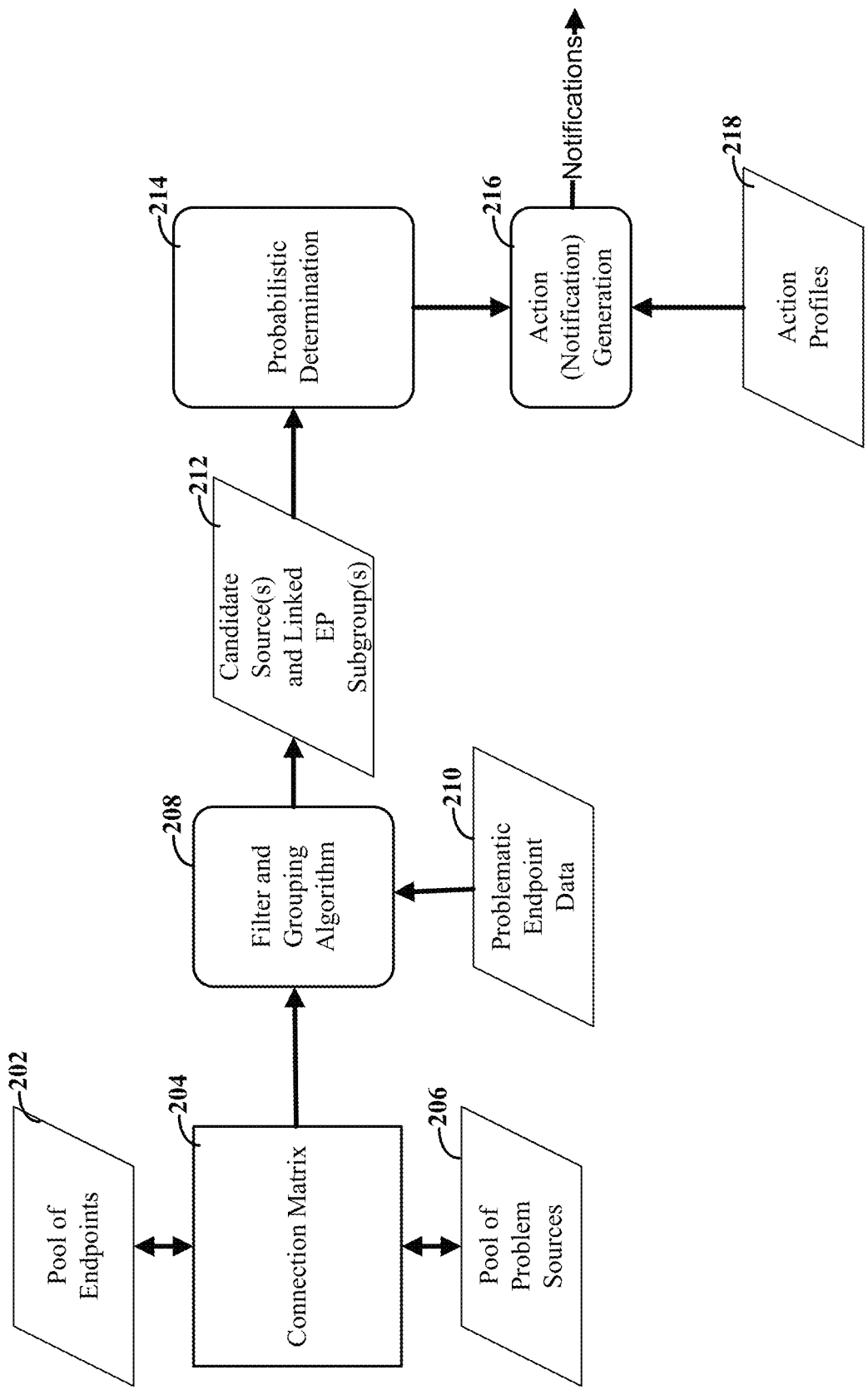
FIG. 2 depicts a flow diagram for monitoring endpoint statuses and for generating corresponding notifications or other actions, consistent with embodiments of the present disclosure.

FIG. 2 depicts a flow diagram for monitoring endpoint statuses and for generating corresponding notifications or other actions, consistent with embodiments of the present disclosure. Consistent with the related discussion herein, the functions associated with the flow depicted in FIG. 2 can be carried out using one or more computer servers, such as the monitor server discussed in connection with FIG. 1. A database can store the list of endpoints 202 along with a list of the potential problem sources 206. The items in these two lists can be associated or correlated to one another, as indicated by the connection matrix 204. For example, each endpoint can be associated with different components in a communication path between the endpoint and an SIP server that the endpoint is registered with.

According to various embodiments, the pool of problem sources 206 can specify sources according to responsible entities. For example, a business entity that has a number of VoIP endpoint devices at an office location might be identified as a problem source and an ISP provided might be identified as another problem source. This level of specificity can be particularly useful when the monitor server does not have knowledge of the specific configuration and devices that are part of the entities respective system. The corresponding threshold triggers and actions/notifications can therefore be implemented at the entity level. In certain embodiments of the present disclosure, the pool of problem sources 206 can specify particular components in a communication path between the endpoints and the SIP servers. For instance, the pool of problem sources might associate an endpoint with each of a wireless access point, a device providing a firewall, configuration of devices with respect to a Network Address Translation (NAT) router, a modem, a Domain Name System (DNS) server, and one or more routers. In this manner, the specificity of the particular communication path can be more clearly identified and analyzed relative to only specifying entities.

According to embodiments, the SIP servers can also be included in the list of potential problem sources. For example, a large subgroup could include all endpoints registered to a particular SIP server. If the SIP server becomes unavailable or exhibits connectivity problems, then endpoints from across the large subgroup might be affected. Rather than sending out notifications to many different entities corresponding to the affected endpoints, the monitor server can be configured to first provide a notification to an entity that is responsible for maintaining the SIP server.

In some embodiments of the present disclosure, a filtering and grouping algorithm 208 can be applied to generate candidate problem sources and their linked endpoint subgroups 212. In addition to information from the list of endpoints 202, list of the potential problem sources 206, and connection matrix 204, data specifying potential problems with endpoints 210 can be used in the filtering and group algorithm. For example, the problematic endpoint data 210 might identify endpoints that did not provide registration messages within a set time window (e.g., 10 minutes). The filtering and grouping algorithm can identify candidate subgroups for these identified endpoints. The subgroups can be generated by first identifying problem sources associated with the endpoints identified in endpoint data 210. Working backward from the problem sources, the associated endpoints can then be identified. The resulting data set of is a set of candidate sources and their respective subgroup(s).

A probabilistic determination 214 can then be made for each of the candidate problem sources specified in the data set 212. In certain embodiments, the result can be a probability that each of the potential problem sources is causing one or more of the problems identified in the problematic endpoint data 210. In some cases there may be multiple different problems associated with a single potential problem source. For example, some endpoints associated with a potential problem source might report call quality issues while other endpoints associated with the same potential problem source might be identified as having lost connectivity with an SIP server. In some instances, the algorithm could be configured to calculate a separate likelihood for each set of endpoints and associated problem. Depending upon the configuration for the trigger thresholds, each of these separate likelihoods might have a different trigger threshold level, or they could be aggregated and the result compared to a trigger threshold level.

In some instances, the algorithm can be configured to integrate the data from the different problems into a single probability determination. For instance, the algorithm can be configured to determine the probability that the particular combination of problematic endpoints, with the different respective problems, would occur due to a problem with each potential problem source. As an example, a firewall configuration problem might be expected to manifest itself with loss of connectivity for endpoints blocked by the firewall, but not with call quality problems. Conversely, a data bandwidth issue might be expected to have call quality problems, and if the problem is extreme, also with loss of connectivity. Appropriate actions can then be generated, per block 216, and as specified in one or more action profiles 218.

Consistent with some embodiments, the probabilistic determination 214 can take into consideration known status changes for groups of endpoints and for specific customer infrastructure. These status changes can be added to the pool of problem sources and a probability distribution can be created. For example, a potential problem source might be generated when endpoints receive a software update. Historic data and predictions on likely issues that can arise can be used to develop the probability distribution. The entity responsible for the software updates can be added into the action profile along with the desired action (e.g., email notification). A similar procedure can be implemented in response to known changes to an entities system.

In other instances, the monitor server, as part of the filter and grouping algorithm 208, can be configured to proactively and automatically identify anomalies based upon metadata for the endpoint devices and potential problem sources. For instance, the monitor server can compare metadata from problematic endpoints 210 to find commonalities. The monitor server can also compare the metadata from problematic endpoints to endpoints that did not exhibit connectivity problems to identify differences between the problematic and non-problematic endpoints. As one example, the metadata might specify the software version and configuration for each endpoint device, which might be useful for identifying a specific software version that is causing a problem, or for identifying a problematic configuration for certain endpoints, such as the use of a particular port that might not be open in a firewall. This information can then be included in the notifications to assist in troubleshooting any problems.

Figure 3:
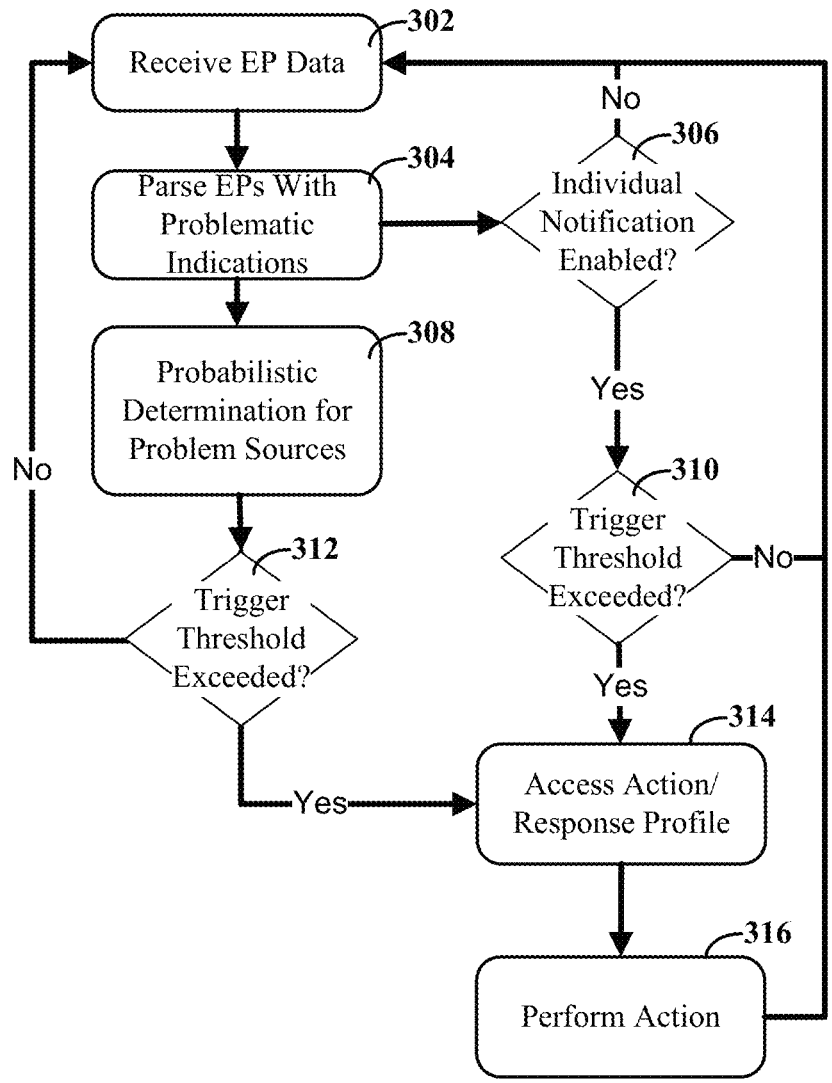
FIG. 3 depicts a flow diagram for functions provided by a monitor server, consistent with embodiments of the present disclosure.

FIG. 3 depicts a flow diagram for functions provided by a monitor server, consistent with embodiments of the present disclosure. According to various embodiments, endpoint data that includes potential problems can be received by the monitor server, as depicted in block 302. This data can be received from multiple sources and through multiple processes. For example, endpoint devices can report call quality to their assigned SIP server (e.g., using and SIP publish message), which can send the data on to the monitor server. The endpoint devices can also be configured to provide call quality data directly to the monitor server. In another example, the endpoint statuses (e.g., as indicated by SIP registration messages) can be provided from the SIP servers to the monitor server. In some instances, the endpoint devices can be configured to send a notification directly to the monitor server if the endpoint device is unable to connect with the assigned SIP server.

The monitor server can use the data to parse the pool of endpoint devices based upon the endpoint devices with problematic indications and their associated subgroups, per block 304. For instance, the monitor server can be configured to parse endpoints based upon call quality data by identifying call quality that is below a minimum threshold or upon a failed receipt of an expected registration communication. The monitor server can then determine what subgroups the endpoint is within.

In certain embodiments, the monitor server can be configured to provide notifications to individual users of endpoints. For example, an individual might have a VoIP endpoint device at their home or office. The monitor server can check each parsed endpoint to see whether or not the individual notification option is enabled for that endpoint, per block 306. If not, the individual notification process ends until additional endpoint (EP) data is received, per block 302. If the individual notification option is enabled for any of the endpoints, the monitor server can determine whether or not a trigger threshold/level is exceeded, per block 310. If not, then the individual notification process ends until additional endpoint data is received, per block 302. If a trigger threshold is exceeded, then the monitor server can access an action/response profile to determine which individual to contact, per block 314. The appropriate action (e.g., a notification message) can then be performed, per block 316. Consistent with various embodiments, the action/response profile can also specify different manners in which to contact the individual depending upon the type of problem. For instance, an individual may not wish to be contacted via email if the likely source of the problem is that the individual's Internet connection is not functioning properly. Moreover, the monitor server can be configured to use status information about the user to determine the appropriate way to contact the individual. This might include detecting whether or not an individual is actively logged into a social networking platform, a cloud service, or similar service. The monitor server could then select between corresponding contact methods.

In various embodiments, the monitor server can be configured to make probabilistic determinations for problem sources corresponding to the parsed endpoint devices, per block 308. For example, the monitor server can be configured to determine the likelihood that various potential problem sources have an issue with their functionality. The monitor server can then determine whether or not a corresponding trigger threshold is exceeded, per block 312. This can include, for example, comparing the determined probability to a threshold probability level. As discussed herein, there can be multiple trigger thresholds for each problem source and each trigger threshold can correspond to a different indicated problem (e.g., call quality and connectivity loss). If the trigger threshold is not exceeded, then the monitor server can wait for more endpoint data to be received, per block 302. If the trigger level is exceeded, then the monitor server can access an action/response profile and perform the appropriate action, per blocks 314 and 316 and as discussed in more detail herein. For instance, an action profile can be stored in a database or memory circuit that is accessible by the monitor server.

In certain embodiments, a monitor server can be further configured to correlate status information of individual(s) associated with endpoint device(s) to further characterize potential problems. For example, the online presence of a device connected on the same network as the endpoint may signify that the problem is with the endpoint device itself. In some embodiments, the monitor server can access profile information for the individual to identify alternative devices likely to be located on the same network as the endpoint device. The monitor server can then attempt to contact one or more of these devices.

According to various embodiments, actions indicated in the action profile can include configuration of call functions. For instance, an automated call forwarding option can be enabled along with notification. The number to which the call is forwarded can be preselected by the individual, or dynamically selected based upon knowledge of the location for the individual. In some instances, the call forwarding can be automated by first checking status relative to multiple devices enabled for VoIP and expected to be located at individual's location. If such devices are present, then they can be selected for forwarding. In certain embodiments, the notification can include an option for configuration changes in an email or text message. The option could, for example, be provided as a web link back to the monitor server, which can then serve up a website that presents various call options, such as call forwarding or setting up an automated call response for incoming calls.

According to certain embodiments, actions indicated in the action profile can specify that active testing be performed to further characterize problems with the endpoint devices. This can include, for example, actively attempting to contact the endpoint devices to check whether or not they are reachable. Another active test could be testing the connection attributes by sending and receiving data from the endpoint device (e.g., to determine latency, detect dropped packets, etc.). The endpoints could be configured to perform a test procedure in which data is sent and received to simulate an active call between the endpoint and the monitor server (or another server). The monitor server can then use this additional data to help determine the likely source of the problem.

In various embodiments of the present disclosure, trigger thresholds can be created relative to a baseline or nominal value for the corresponding parameter. For instance, a call quality profile can be created for different subgroups and their corresponding potential problem devices. The call quality profile can be developed by monitoring the call quality over time. A nominal call quality value can be determined (e.g., using averaging) and a trigger threshold can be determined relative to an allowable deviation from the nominal value. The deviation can be, for example, a set value or a set percentage of the nominal value.

In some instances, the monitor server can use a profile that has different nominal values depending on other conditions. One such condition can be the time, whether time of day, day of week, month, or combinations thereof. For example, a particular endpoint group may share data bandwidth with many devices that are particularly active in the evenings from 6 PM until 10 PM. Thus, the profile might indicate that nominal call quality is therefore significantly lower during these times. Setting thresholds based upon deviations from such a profile can be particularly useful for providing notifications for abnormal conditions while not repeatedly issuing notifications for a known and accepted issue. In certain instances, there can be multiple thresholds active at the same time and for the same parameter. For example, there can be a first threshold that uses call quality deviation value as well as a second threshold that uses a set value (e.g., a minimum call quality regardless of the nominal value). In such an example, a notification could be triggered if either threshold is exceeded. The monitor server can also be configured to use a minimum threshold level below which no notification is generated even if the nominal/baseline threshold is exceeded. Various combinations of multiple different thresholds are possible.

Figure 4:
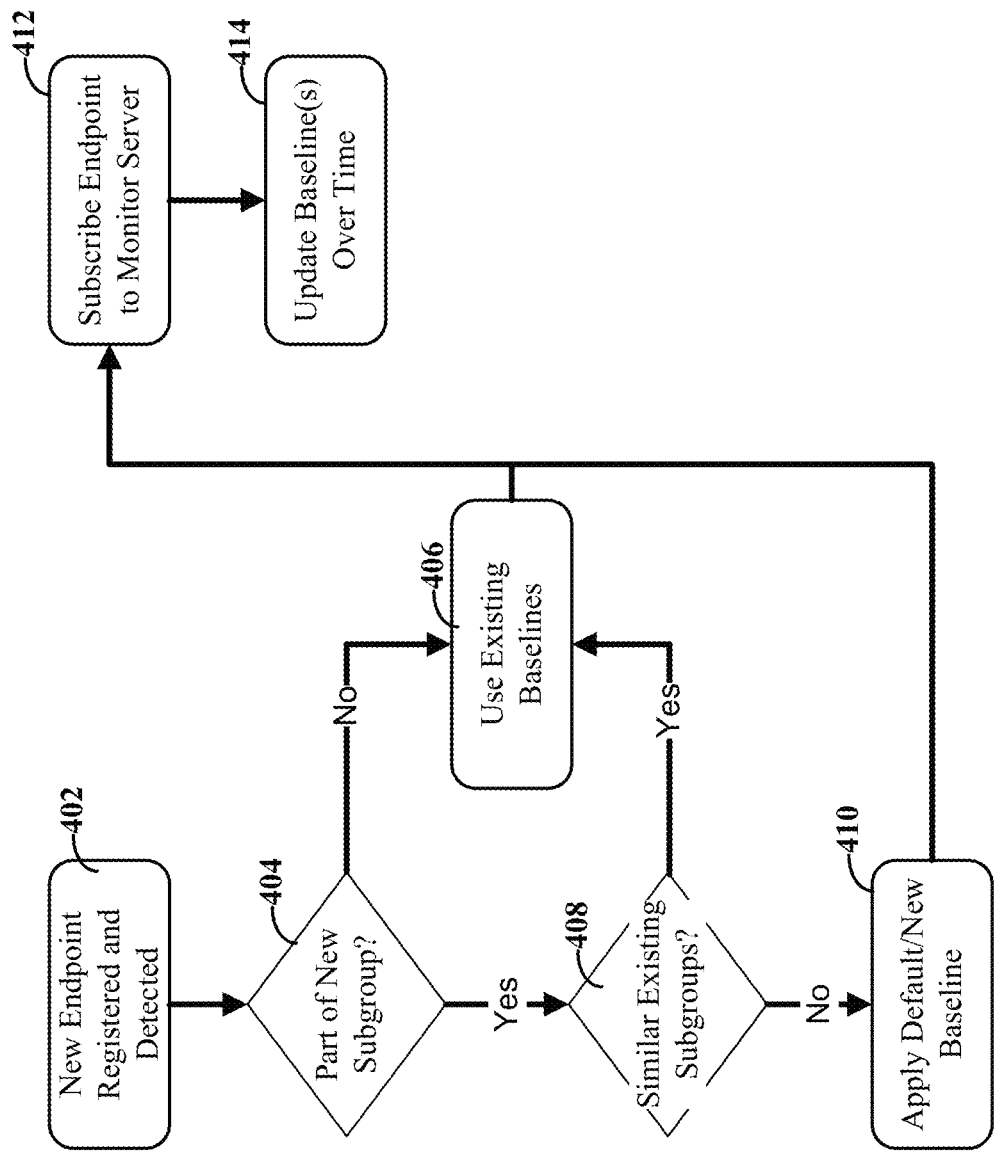
FIG. 4 shows a flow diagram for adding an endpoint to the system, consistent with embodiments of the present disclosure.

FIG. 4 shows a flow diagram for adding an endpoint to the system, consistent with embodiments of the present disclosure. The flow begins when a new endpoint registers with an SIP server and is thereby detected, per block 402. In addition to an entirely new endpoint, the flow can also begin when a previously known endpoint registers from a new (logical or physical) location that indicates a possible change in the routing path to the SIP server. Another change, not expressly shown, is a change in an upstream device in the routing path between one or more endpoints and the SIP server. The system can be configured to detect such changes in order to properly update the profiles according to the detected changes.

According to various embodiments, the SIP server can notify the monitor server of the new endpoint (or similar change) and the monitor server can determine whether or not the endpoint is part of a new subgroup or an existing subgroup, per block 404. In various embodiments, this check can be repeated for each subgroup that the endpoint belongs. When the subgroups are defined by each of the devices along the routing path, repeating the check allows for each device to be considered. If the subgroup is already existing, then the monitor server can use an existing baseline for the endpoint, per block 406.

In various embodiments, the monitor server can be configured to select an existing baseline to use for new subgroups. For example, the monitor server can apply an algorithm that generates a similarity score between the new subgroup and existing subgroups. In some instances, the algorithm can compare different properties of the endpoint, devices in the routing path, and testable parameters (e.g., number of hops in the routing path, or latency to the endpoint device), and each property can be given a different weight. The monitor server can then select a subgroup with the highest score. In some embodiments of the present disclosure, the monitor server can determine whether or not any subgroups are similar enough, per block 408. This can be accomplished, for example, by using a minimum score from the algorithm before selecting and applying an existing baseline, per block 406. If no subgroup is sufficiently similar, then the monitor server can apply a new default baseline, per block 410.

As discussed herein, if a publish-subscribe approach or protocol is being used, then the monitor server can be subscribed to the endpoint, per block 412. According to various embodiments, the baseline, whether taken from an existing baseline or a default baseline, can be updated by the monitor server over time, per block 414.

Figure 5:
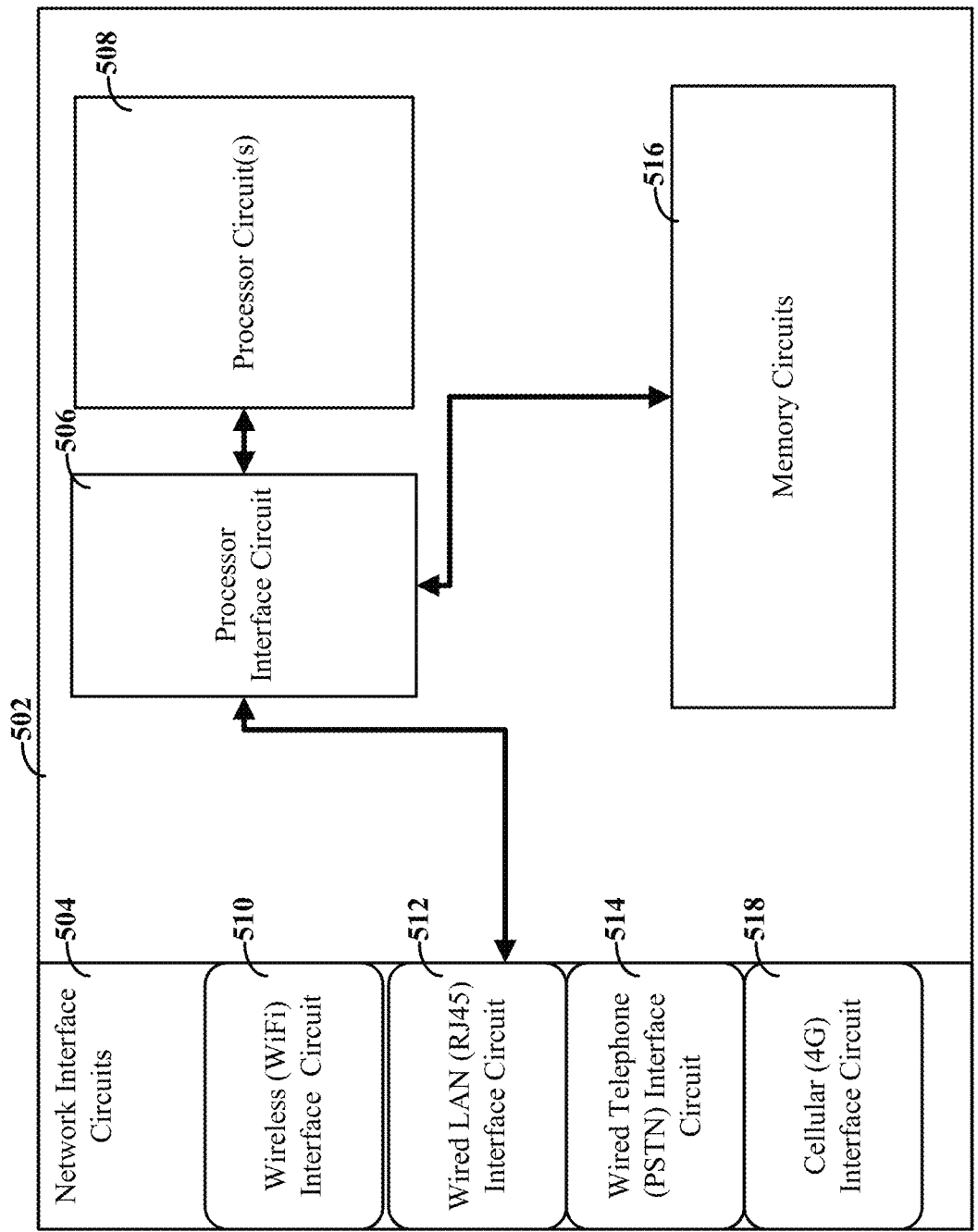
FIG. 5 depicts a block diagram for a monitor device, consistent with embodiments of the present disclosure.

FIG. 5 depicts a block diagram for a monitor device, consistent with embodiments of the present disclosure. Consistent with embodiments of the present disclosure, the monitor device 502 can be a hardware device that can be installed on the same network that VoIP endpoint devices reside. For example, a business may have VoIP endpoint devices for their employees at a particular location. VoIP endpoint devices can be connected to the Internet through a LAN that the business operates for its employees at the particular location. One or more monitor devices are also connected to the LAN so that the monitor devices can provide additional information about problems with the VoIP endpoint devices.

The monitor device 502 is depicted as including one or more processing circuits 508 e.g., microprocessors or CPUs. A processor interface circuit 506 serves to provide communication channels to memory circuits 516 and other data sources, including the network interface circuits 504. The memory circuits 516 can include one or more memory cache circuits, volatile memory circuits serving as main memory, and non-volatile memory circuits for long term data storage.

According to some embodiments, the monitor device 502 can include multiple different network interface circuits 504. A first type of interface circuit is a wireless interface circuit 510 can connect to a wireless LAN using, as an example, the IEEE 802.11 standards (WiFi). Another type of interface circuit is a wired LAN interface circuit 512 that provides a wired LAN connection. For instance, the wired LAN interface circuit 512 can be used with a category 5 cable with an RJ45 connector can be used to connect to a LAN. A third type of interface circuit is a wired telephone interface circuit 514 that communicates using a wired telephone connection. For instance, a registered jack (RJ-11/RJ-14/RJ-25) can connect to the wired telephone interface circuit 514 and the wired telephone interface circuit 514 serves as a modem for communicating data over the public switched telephone network (PSTN). Yet another type of interface circuit is a cellular telephone interface circuit 518 that communicates using data networks offered by cellular telephone providers (e.g., 3G/4G technologies).

According to certain embodiments, the monitor device 502 monitors and tests characteristics of the LAN that is used by the VoIP endpoint devices using the corresponding network interface circuit 504. In situations where monitor device detects problems with the corresponding network interface circuit 504 (e.g., the monitor device 502 is unable to report the characteristics to a monitor server), the monitor device selects a different network interface circuit 504 to attempt to report the data. For example, a monitor device 502 first attempts to use a LAN used by the VoIP endpoint devices to contact the monitor server. The monitor device 502 can determine that the LAN is experiencing problems that are preventing the monitor device from contacting the monitor server. The monitor device 502 can then attempt to contact the monitor server using a secondary network interface circuit 504, such as through a cellular telephone interface circuit 518.

The ability to have a single/dedicated monitor device 502 with multiple communication capabilities can be particularly useful for detecting and fixing connectivity problems with VoIP endpoint devices. For example, consider a large organization that has many hundreds of VoIP telephones serving as VoIP endpoint devices and on the same LAN. The use of a single monitor device 502 on the LAN allows the monitor server to receive diagnostic information about the LAN when the monitor server is not able to directly access the VoIP endpoint devices. Rather than increasing the cost of each of the VoIP endpoint devices by including alternative multiple communication capabilities, a single (or small number of) monitor device 502 is installed on the LAN.

Consistent with particular embodiments of the present disclosure, the monitor device 502 can be configured to collect information from the endpoint devices. The monitor device 502 then forwards the collected information to the monitor server. Moreover, the monitor device 502 can forward information or commands from the monitor (or other) server to the endpoint devices. In this manner, the monitor device 502 provides bidirectional access to the endpoint devices through an alternative connection point. For example, the monitor server can receive endpoint status information through the monitor device 502. The monitor server can then send update information to one or more of the endpoint devices to manually reconfigure the devices (e.g., by changing settings or as a software update).

Various blocks, modules or other circuits may be implemented to carry out one or more of the operations and activities described herein and/or shown in the figures. In these contexts, a "device" (also sometimes "logic circuitry" or "module") is a circuit that carries out one or more of these operations and activities. For example, in certain above-discussed embodiments, discrete logic circuits, central processor circuits, or programmable logic circuits are configured and arranged for implementing the operations and activities shown in the various figures and discussed herein. Also, it will be apparent that a server is defined as one or more computer processing circuits that are configured to provide services to other circuit-based devices (e.g., providing services by way of a corresponding software platform). For example, an SIP server is a server that is configured and arranged to receive/transmit SIP control data for a VoIP call between endpoint devices. The other circuit-base devices connect to the server over one or more networks. The server can include appropriate interface circuits, such as a network interface card (NIC), that are designed to communicate using protocols such as Ethernet. In the context of the present disclosure, the skilled artisan will recognize that a "monitor server" is a server that is configured to perform the monitor services and functions discussed herein. Moreover, a (VoIP) endpoint device includes processing circuits that are configured to establish (VoIP) communication sessions with other devices (e.g., personal computers, IP-enabled mobile phones, and tablet computers). In certain embodiments, such processing circuits are programmed to execute a set (or sets) of instructions. The instructions (and/or configuration data) can be in the form of instructions stored in, and accessible from, a memory circuit. As an example, an endpoint device can by a VoIP telephone that includes a combination of a Central Processing Unit (CPU) hardware-based circuit and a set of instructions stored in the form of firmware. In some instances, multiple servers share hardware circuitry, such as a common CPU hardware circuit and memory circuit, where each server is configured to execute a corresponding set of instructions. Certain embodiments are directed to a computer program product (e.g., nonvolatile memory device), which includes a machine or computer-readable medium having stored thereon, instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, although aspects and features may in some cases be described in individual figures, it will be appreciated that features from one figure can be combined with features of another figure even though the combination is not explicitly shown or explicitly described as a combination. Such modifications do not depart from the true spirit and scope of various aspects of the invention, including aspects set forth in the claims.

What is claimed is:

1. A system that includes a plurality of Session-Initiation-Protocol (SIP) servers to provide data communications services for data communications endpoints, the system comprising:
    a monitor circuit to perform diagnostic tests in response to instructions and in connection with call quality associated with the data communications services; and
    a server having at least one processor circuit configured to:
        receive connectivity status of the endpoints including data to update a change associated with a routing path used to provide the data communications services;
        assess call quality metrics of services using data provided by the endpoints to the SIP servers;
        parse, based upon the received connectivity status and the call quality metrics, endpoints having connectivity issues or problems into a subgroup corresponding to endpoints on a local area network (LAN); and
        transmit, based upon potential problem sources associated with the connectivity status or the change associated with a routing path, a command to the monitor circuit having a LAN interface circuit, wherein the command is to instruct the monitor circuit to perform a diagnostic test involving the LAN interface circuit.

2. The system of claim 1, wherein the monitor circuit is configured to identify potential problem sources of call quality by identifying potential sources that are common between endpoints exhibiting respective call quality metrics, and is further configured to passively monitor network packets on the LAN and to include results of the passive monitoring with results from the diagnostic test.

3. The system of claim 1, wherein the monitor circuit is further configured to transmit results from the diagnostic test over an additional communication interface circuit in response to detecting problems with the LAN interface circuit, and wherein the call quality metrics include information selected from the group consisting of: transmission latency, jitter, packet loss, dropped calls, feedback from users, and a combination thereof.

4. The system of claim 3, wherein the additional communication interface circuit is a cellular network interface circuit.

5. The system of claim 3, wherein the additional communication interface circuit is a wireless interface circuit.

6. The system of claim 1, wherein the monitor circuit is further configured to identify the diagnostic test by decoding the command and is further configured and arranged to measure and provide to the server additional information associated with the parsed endpoints, the additional information being associated with data selected from one of or a combination of the group consisting of: additional call quality metrics, a network of a client associated with the parsed endpoints, the LAN, firewall, and Internet Service Provider (ISP) routing.

7. The system of claim 1, wherein the server is further configured to:
  determine whether the subgroup exceeds a corresponding trigger threshold associated with at least one of the call quality metrics and connectivity status;
  access, in response to determining that the corresponding trigger threshold is exceeded for the subgroup, an action profile specifying an entity; and
  transmit, to the specified entity, a notification identifying a corresponding potential problem source from the potential problem sources.

8. The system of claim 1, wherein the server is further configured and arranged to receive Session-Initiation-Protocol (SIP) publish notifications containing call quality data about the endpoints, the call quality data being indicative of the call quality metrics.

9. The system of claim 1, wherein the server is further configured and arranged to determine a nominal value for a call quality metric among the call quality metrics for the subgroup and to use a trigger threshold that is based upon a deviation from the determined nominal value.

10. A method for use in a system that includes a plurality of Session-Initiation-Protocol (SIP) servers that are to provide data communications services for data communications endpoints, the method comprising:
  by a server having at least one computer processor circuit:
    receiving connectivity status of the endpoints including data to update a change associated with a routing path used to provide the data communications services;
    assessing call quality metrics of data communications services provided by the endpoints using data provided by the endpoints to the SIP servers;
    parsing, based upon the received connectivity status and the call quality metrics, endpoints having connectivity problems into a subgroup corresponding to endpoints on a local area network (LAN);
    transmitting, based upon potential problem sources associated with the connectivity status or the change associated with a routing path, a command to a monitor circuit having a LAN interface circuit, wherein the command is to instruct the monitor circuit to perform a diagnostic test involving the LAN interface circuit; and
    in response to the command and by the monitor circuit, performing the diagnostic test involving the LAN interface circuit.

11. The method of claim 10, further comprising using the monitor circuit to passively monitor network packets on the LAN, and including results of the passive monitoring with results from the diagnostic test.

12. The method of claim 10, further comprising transmitting, by the monitor circuit, results from the diagnostic test over an additional interface circuit in response to detecting problems with the LAN interface circuit.

13. The method of claim 12, wherein the additional interface circuit is a cellular network interface circuit.

14. The method of claim 12, wherein the additional interface circuit is a wireless interface circuit.

15. The method of claim 10, further comprising identifying, by the monitor circuit, the diagnostic test by decoding the command.

16. The method of claim 10, further comprising using the server to:
  determine whether the subgroup exceeds a corresponding trigger threshold;
  access, in response to determining that the corresponding trigger threshold is exceeded for the subgroup, an action profile specifying an entity; and
  transmit, to the specified entity, a notification identifying a corresponding potential problem source from the potential problem sources.

17. The method of claim 10, further comprising receiving, at the server, Session-Initiation-Protocol (SIP) publish notifications containing call quality data about the endpoints, the call quality data being indicative of the call quality metrics.

18. The method of claim 10, further comprising determining a nominal value for a call quality metric among the call quality metrics for the subgroup and using a trigger threshold that is based upon a deviation from the determined nominal value.

19. The method of claim 18, further comprising determining and proceeding with an action specified in an action profile of an entity associated with the subgroup responsive to the determined nominal value being outside the trigger threshold.

20. The method of claim 10, further comprising, by the server, determining a nominal value for a connectivity status associated with loss of connectivity for endpoints being associated with an internet service provider (ISP) as the potential problem source for the subgroup and in response to the determined nominal value being outside a trigger threshold, transmitting a notification to an administrator specified in an action profile of an entity associated with the subgroup.

* * * * *